May 26, 1964   R. H. CHASE ETAL   3,134,902
INFRARED CIRCULAR SCAN AERIAL RECONNAISSANCE SYSTEM
Filed Jan. 2, 1959

WITNESSES

INVENTORS
Roland H. Chase, William E. Horn
and Frederic R. Stauffer
BY R.M.Brodahl
ATTORNEY

United States Patent Office 3,134,902
Patented May 26, 1964

3,134,902
INFRARED CIRCULAR SCAN AERIAL
RECONNAISSANCE SYSTEM
Roland H. Chase, College Park, William E. Horn, Baltimore, and Frederic R. Stauffer, Linthicum, Md., assignors to Westinghouse Electric Corporation, East Pittsburgh, Pa., a corporation of Pennsylvania
Filed Jan. 2, 1959, Ser. No. 784,678
3 Claims. (Cl. 250—83.3)

This invention relates to an aerial reconnaissance system, and more particularly to thermally responsive systems employing an infrared scanning technique.

The transmission of information in the infrared region of the electromagnetic spectrum has long been recognized as potentially valuable. With the development of new and better detectors, the useful spectral range has been extended. In general, the development of so-called point infrared detectors has remained consistently ahead of thermal image detectors. A complete image must then be created by a scan technique. Air-to-ground thermal mapping is an obvious and most desirable application of this technique.

Aerial reconnaissance utilizing the infrared radiation from ground targets has been successfully approached from the point of view of providing lateral scan motion, allowing the motion of the air vehicle to provide the second scan direction. The method of transverse scan is usually that of high speed rotation of primary optics, object space scanning, or secondary optics, image space scanning. With this type of scan motion, however, it is quite obvious that the total scene viewed is not reconstructed of uniform elemental areas, since the area viewed by the infrared detector assemblage varies according to the angulation of such detector assemblage during the scanning motion. The type of area coverage per scan which results from this method is one of varying width, increasing correspondingly in opposite directions from the midpoint of the scan. In employing such method for aerial mapping to provide a continuous picture composed of a series of the varying width scan images, portions of such images will overlap and seriously degrade the picture so produced. A choice of overlap arrangement of images determines whether the extent of overlap increases toward the center of the picture or toward the edge of the picture. Furthermore, it will be apparent that during such lateral scanning technique, due to the varying angulation of the infrared detector assemblage, the distance from the elemental ground area observed to the detector assemblage will vary in accord with the angulation irrespective of terrain irregularities, so that the system sensitivity employing this linear scan technique will vary according to the portion of the field observed. Still further, it will be apparent that due to the variation in the instantaneous field of view as seen by the radiation detector assemblage as employed in such lateral scanning technique, the ground area map provided by employment of such technique will be of varying scale and thereby degraded as to accuracy of reproduction. Still further, it will be apparent that such lateral scan technique will observe a given ground object only once in passing over and therefore the system employing same is incapable either of detecting movement of objects or of recognizing third dimensional aspects of the objects being observed.

In view of the foregoing remarks, it becomes a prime object of the present invention to provide an aerial reconnaissance system embodying an improved infrared scanning technique which is devoid of the above limitations and which affords constant area resolution of the field being observed; constant sensitivity over the entire observed field; moving target indication; more accurate presentation of an area being mapped; and third dimensional information with respect to objects represented in the mapped area presentation.

It is another object of the invention to provide such an aerial reconnaissance system as employed either in conjunction with photographic recording or instantaneous viewing presentation.

Other objects and advantages of the invention will become apparent from the following detailed description thereof, taken in connection with the accompanying drawings, in which.

Figure 1:
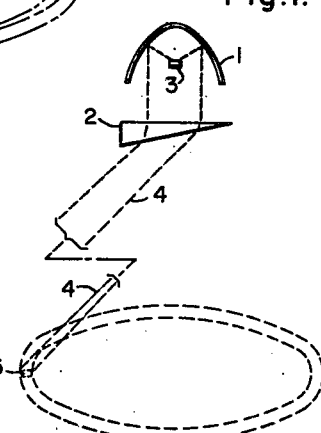
FIGURE 1 is a schematic representation of the novel scanning technique as employed in aerial reconnaissance.

According to a feature of the invention, circular scanning is employed and obtained by use of a rotary scanning head or detector assemblage mounted in an aircraft vehicle. Such assemblage may comprise, as shown in FIG. 1, a parabolic reflector 1 to focus infrared rays as seen by a rotating prism or wedge 2 to an infrared point source detector 3. In the embodiment shown, the rotating prism 2 carried by the aircraft will be arranged to face downwardly for observing the terrain beneath and its rotation is aimed to obtain a circular scan of such terrain at a constant angle with respect to the vertical axis of rotation. The infrared point source detector 3 is placed at the focal point of the parabolic reflector 1, or at the focal point of an optical system if secondary optics, either reflective or refractive, are found desirable for the purpose of more conveniently locating the detector assemblage. The detector size and/or optical focal length are chosen in accordance with the resolution desired.

Figure 2:
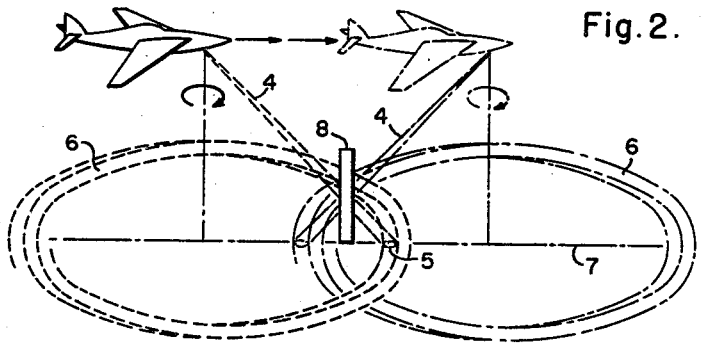
FIG. 2 is a schematic representation illustrating an operational feature of an airborne aerial reconnaissance system employing the novel scanning method.

The circular scan obtained by rotation of the prism 2 will result in the observance, within a rotating incremental observing beam 4, successive elemental areas 5 on the terrain beneath. At a given observer position, the path traced by the rotation of the elemental area 5 will be generally circular as indicated in FIG. 1, but due to advancement of the rotating scanning head along the line of flight in the aerial reconnaissance system, such path in extension takes the form of a spiral scan path 6 as shown in FIG. 2. From FIG. 2, it will be apparent that an object 8 lying along the flight path 7 within the field of scan of the infrared detector on the airplane will be detected twice by the observing beam 4; once during forward orientation of such beam when the aircraft is positioned in advance of the object and again during backward orientation of the observing beam 4 after the aircraft has passed beyond such object. It will be apparent, therefore, that by virtue of the circular scanning technique, as employed in the present system, the infrared detector is capable of recognizing third dimensional aspects of such object, and by virtue of the time lapse between the fore and aft observance of such object, such detector is capable of also recognizing movement of the object which may have transpired in the interim between the successive fore and aft observances.

The rotary scan speed is adjusted and synchronized with the aircraft speed and altitude so that the spiral scan path 6 traced on the ground locates each successive scan semi-circle adjacent to the preceding scan semi-circle along the flight path 7 in such a manner as to insure complete coverage of the terrain being observed.

Figure 3:
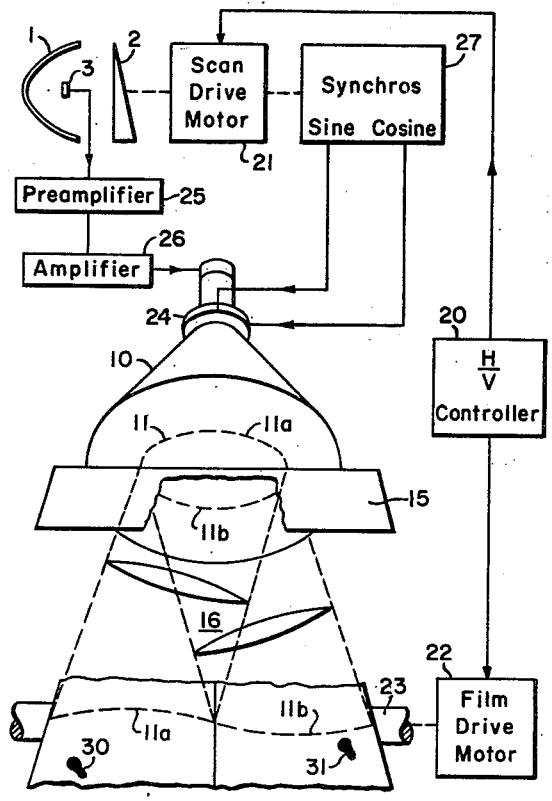
FIG. 3 is a diagram of a film presentation aerial reconnaissance system embodying the novel scanning method.
Figure 4:
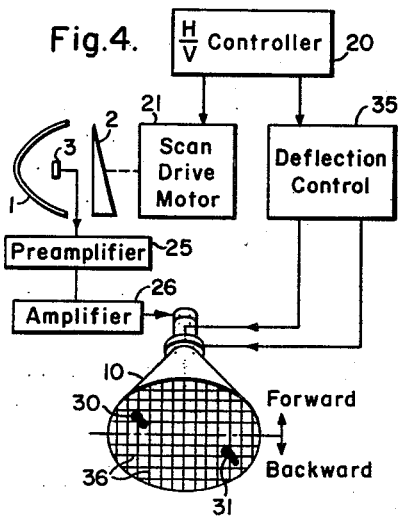
FIG. 4 is a diagrammatic representation of an aerial reconnaissance system embodying the novel scanning method as employed in instantaneous image presentation.

Referring to FIG. 3, a preferred method of presentation in the novel system embodying the circular scanning technique, includes the producing, on a cathode ray tube, a luminous circular trace image 11 corresponding to rotary movement of the scanning head, and the intensity modulating of such image according to signal output from the detector 3; a top half 11a of image 11 as viewed in FIG. 3 representing the semi-circular trace observed during the forward orientation of the scanning head and the bottom half 11b of the circular trace 11 as viewed in FIG. 3, representing the semi-circular scanning trace observed by the scanning head during its rearward orientation. To obtain representation of the terrain as recognized by the infrared detector, the top and bottom semi-circular portions of the circular trace 11 respective to fore and aft observance of the terrain below are separated by such as a divider element 15 and projected respectively by an optical system 16 onto adjacent halves of a film strip 17 which is moved in synchronism with aircraft speed and height. The optical system 16 may be adjusted so that the semi-circular traces on the film, if superimposed one on the other would substantially duplicate the circle 11 as appearing on the face of the cathode ray tube 10.

Again referring to FIG. 3, synchronization of scanning head speed with aircraft speed and height may be obtained by employment of a well-known velocity-to-height ratio controller 20 through the medium of a scanner drive motor 21 operatively connected to the scanning prism 2, and the same controller 20 may also be employed to synchronize film drive speed through the medium of a film drive motor 22 and such as a film drive roller 23.

To obtain suitable deflection of the beam of tube 10, signals from pick-off synchros 27, driven by the scanner drive motor 21 and having sine and cosine function outputs may be fed to the horizontal and vertical deflecting means 24 associated with tube 10. Modulation of the beam trace in such tube 10 may be obtained by feeding the output from the infrared detector 3 through such as a preamplifier 25 and amplifier 26 to the tube's beam intensity control means.

From the foregoing, it will be apparent that the film presentation system as shown in FIG. 3 will function to record on the film 17 an infrared responsive image representative of objects such as an object image 30 which may appear in the forward viewing picture as recorded on the left portion of the film 17, for example, and subsequently, the same object may appear as an image 31 in the rearward observing picture recorded on the opposite side of the film strip 17. In addition to providing on film, accurate aerial maps of the terrain, variations between longitudinal and lateral positions of counterpart images, such as images 30 and 31, on opposite sides of the film, represents movement of the objects pictured. Furthermore, the binocular viewing represented by the system of FIG. 3 affords the provision of stereoscopic effect by employment of standard viewing techniques to enable recognition of third dimensional characteristics of the objects appearing in such pictures.

Since the elemental area 5 of instantaneous field of view, FIG. 2, is of constant area, it will be apparent that a given area is mapped out on the film 17, FIG. 3, in given time regardless of the position of such instantaneous field of view along the scan line. Since the observed area is constant, and is reproduced as a constant, there is linear correspondence between any film section and the associated section in object space. The result is a ground overlay picture presentation as opposed to the distortion inherent in the presentation of a fixed angular resolution straight line strip map.

To embody the novel scanning technique in a sytem for instantaneous presentation, the film and drive arrangement as well as the optical divider system of the FIG. 3 system may be dispensed with and the sync pick-offs 27 substituted by a suitable deflection control 35 which will respond to dictates of the velocity-to-height ratio controller 20 to trace on opposite halves of the face of the cathode ray tube 10 the forward and reverse images as pictured on film in the system of FIG. 3. By virtue of such as grid lines 36 appearing on the face of the tube 10, movement of an object observed by the system may be recognized by differences in the relative positions of the fore and aft representations of such object as appearing on different portions of the face of the tube 10.

Since numerous changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A method of aerial reconnaissance comprising the steps of rotarily scanning the terrain at an angulated attitude with infrared detector means advanced along a flight path whereby such detector means alternately and successively views forwardly and rearwardly, continuously producing a luminous circular trace image corresponding to scanning movement of the detector means, intensity modulating the circular trace image according to signal output from the detector means, dividing the intensity modulated circular trace image into semi-circular halves respective to the forward and rearward observance of said detector means, and projecting the semi-circular halves of such trace image onto respective sides of a moving strip film whereby forwardly and rearwardly observed picturizations are simultaneously recorded.

2. A method of aerial reconnaissance comprising the steps of rotarily scanning the terrain beneath at a constant angulation degee attitude with infrared point source detector means advanced along a flight path whereby alternate and successive forward and rearward views are obtained, correlating the rate of rotary scan of such detector means with observer altitude and ground speed whereby successive scans of the observed terrain will lie adjacent one another in the path-of-flight direction, producing a luminous trace image corresponding in time sequence to the rotary scan positions and modulated in intensity according to the output signal from the detector means, and separating the portions of the luminous trace image respectively to forward and rearward observance attitudes of the detector means for differentiation of the visual information represented.

3. A method of aerial reconnaissance comprising the steps of rotarily scanning the terrain beneath at a constant angulation degree attitude with infrared point source detector means advanced along a flight path whereby alternate and successive forward and rearward views are obtained, correlating the rate of rotary scan of such detector means with observer altitude and ground speed whereby successive scans of the observed terrain will lie adjacent one another in the path-of-flight direction, producing a luminous trace image corresponding in time sequence to the rotary scan positions and modulated in intensity according to the output signal from the detector means, separating the portions of the luminous trace image respectively to forward and rearward observance attitudes of the detector means, and recording such separated portions of the trace image on respective sides of a moving strip film.

References Cited in the file of this patent

UNITED STATES PATENTS

| | | |
|---|---|---|
| 2,423,885 | Hammond | July 15, 1947 |
| 2,648,838 | Raymond | Aug. 11, 1953 |
| 2,686,268 | Martin et al. | Aug. 10, 1954 |
| 2,740,961 | Slater | Apr. 3, 1956 |
| 2,842,760 | McLucas | July 8, 1958 |
| 2,856,809 | Blackstone | Oct. 21, 1958 |
| 2,929,305 | Blackstone | Mar. 22, 1960 |
| 2,949,055 | Blackstone | Aug. 16, 1960 |

FOREIGN PATENTS

| | | |
|---|---|---|
| 1,165,448 | France | Oct. 24, 1958 |